United States Patent [19]

Nishiura et al.

[11] Patent Number: 5,279,659
[45] Date of Patent: Jan. 18, 1994

[54] CELLULOSE ESTER FILM CONTAINING PHOSPHORIC ESTER PLASTICIZER AND AROMATIC CARBOXYLIC ESTER AND PROCESS FOR PREPARATION OF THE SAME

[75] Inventors: Yosuke Nishiura; Yukio Shinagawa, both of Kanagawa, Japan

[73] Assignee: Fuji Photo Film Co., Ltd., Kanagawa, Japan

[21] Appl. No.: 769,687

[22] Filed: Oct. 2, 1991

[30] Foreign Application Priority Data

Oct. 2, 1990 [JP] Japan .................................. 2-264445

[51] Int. Cl.$^5$ ........................... C08L 1/10; C08J 3/18
[52] U.S. Cl. .................................. 106/177; 106/181; 106/198
[58] Field of Search ................. 106/177, 181, 198

[56] References Cited

U.S. PATENT DOCUMENTS

| | | | |
|---|---|---|---|
| 1,984,284 | 12/1934 | Reid et al. ................ | 106/181 |
| 2,115,708 | 5/1938 | Dreyfus .................... | 106/179 |
| 4,133,783 | 1/1979 | Brewer et al. ............. | 106/181 |
| 4,133,823 | 1/1979 | Joyce, III et al. ......... | 106/177 |

*Primary Examiner*—David Brunsman
*Attorney, Agent, or Firm*—Sughrue, Mion, Zinn, Macpeak & Seas

[57] ABSTRACT

A cellulose ester film contains a phosphoric ester as a plasticizer. The film further contains an aromatic carboxylic ester represented by the formula [I].

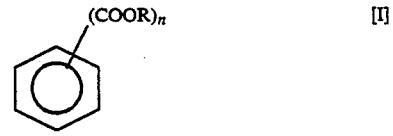

in which n is 3, 4, 5 or 6; R is an alkyl group or an alkenyl group, each of which may have one or more substituent groups; the benzene ring may have one or more substituent groups other than the groups represented by —COOR; and the groups represented by —COOR may be different from each other. A process for preparation of the film is also disclosed.

13 Claims, No Drawings

CELLULOSE ESTER FILM CONTAINING PHOSPHORIC ESTER PLASTICIZER AND AROMATIC CARBOXYLIC ESTER AND PROCESS FOR PREPARATION OF THE SAME

FIELD OF THE INVENTION

The present invention relates to a cellulose ester film containing a phosphoric ester plasticizer and a specific aromatic carboxylic ester and a process for preparation of the same.

BACKGROUND OF THE INVENTION

A cellulose ester film has mainly been used as a support of recording materials such as a photographic material. Examples of cellulose ester include cellulose acetate, cellulose acetate butylate and cellulose acetate propionate. Cellulose acetate film (particularly cellulose triacetate film) has been widely used because it has excellent properties such as dimensional stability, transparency and gloss.

The cellulose ester film generally has low mechanical strengths such as tearing strength, folding endurance and impact strength. Particularly at low temperature, the film is very hard, brittle and easy to be teared.

It has been well known that a monomeric plasticizer is added to the film to improve the mechanical strengths. Examples of the monomeric plasticizer include triphenyl phosphate, tricresyl phosphate, octyl diphenyl phosphate, triethyl phosphate, tributyl phosphate, diethyl phthalate, dimethoxyethyl phthalate, ethylphthalyl ethyl glycolate, butyl phthalyl butyl glycolate and triacetin. A phosphoric ester such as triphenyl phosphate has mainly been used for cellulose triacetate film.

The preparation for preparation of the cellulose ester film generally comprises the steps of dissolving the cellulose acetate and a plasticizer in a solvent to prepare a dope, casting the dope on a support and evaporating the solvent. Methylene chloride is mainly used as the solvent. The support usually is a drum or a band which has a polished surface. For example, the film can be prepared by casting a specific dope on a support at a temperature of not more than 10° C., exposing the dope to blowing air for at least 2 seconds, peeling off and drying the resulting film at a high temperature (100° to 160° C.) to evaporate the remaining solvent to obtain a film (cf., Japanese Patent Provisional Publications No. 60(1985)-176834 and No. 60(1985)-203430).

In the above-mentioned process, the monomeric plasticizer tends to be evaporated with the remaining solvent. The evaporated plasticizer induces contamination at the drying step. Further, the plasticizer migrates vertically so that the distribution of the plasticizer tends to be heterogeneous. These problems are very serious because they cause curling of the film and unsatisfactory adhesion between the film and a coated layer provided thereon. In order to solve these problems, polymeric plasticizers have been proposed (cf., Japanese Patent Publications No. 43(1968)-16305, No. 44(1969)-32672 and No. 47(1972)-760). Examples of the polymeric plasticizers include specific polyurethanes polyesters and copolymers thereof which are soluble in methylene chloride.

The polymeric plasticizers can be used to solve the problems caused by the migration and volatilization of the plasticizer. Further, the polymeric plasticizers much enhance the mechanical strengths (such as the tearing strength and the folding endurance) of film at a low temperature. However, the films using the polymeric plasticizers exhibit large dimensional variation depending on humidity. A large dimensional variation induces expansion or shrinking of intervals between perforations, and causes serious troubles such as a projection hitch and shift of printing, particularly in the case that the film is used as a photographic support. Further, the films using the polymeric plasticizers are very combustible. The combustibility is a serious problem when the cellulose ester film is used. For example, the combustibility of a movie film is strictly defined in Japanese Industrial Standard. Moreover, when the film is used as a support of photographic material, the plasticizer should not affect photographic properties.

Japanese Patent Provisional Publication No. 60(1985)-250053 proposes using a dimer of a halogenated alkylphosphoric ester as a plasticizer to solve the above-mentioned problems. The problems caused by the migration and volatilization of the monomeric plasticizer are also solved by this plasticizer. However, the mechanical strengths of the film such as the tearing strength and the bending strength are still insufficient, and desired to be more improved.

SUMMARY OF THE INVENTION

As is mentioned above, even though a polymeric plasticizer is used to solve the problems of the monomeric plasticizer, new problems are caused by the polymeric plasticizer. Therefore, the present inventors have tried to improve the film containing a monomeric plasticizer again.

A phosphoric ester such as triphenyl phosphate is an excellent monomeric plasticizer. The phosphoric ester plasticizer improves the strengths and the non-combustibility of the film. In the case that a relatively large amount of the phosphoric ester plasticizer is used, the strength of the film is greatly improved and the dimensional variation is reduced. However, the phosphoric ester is disadvantageous with respect to the problems of the migration and the volatilization. If a relatively large amount of the phosphoric ester is used, the ester tends to be gradually deposited on the surface of the film (so-called "bleeding" is caused), while the film is preserved or used.

An object of the present invention is to provide a cellulose ester film containing a phosphoric ester plasticizer, which is improved in dimensional stability and strength property without causing bleeding.

There is provided by the present invention a cellulose ester film which contains a phosphoric ester plasticizer, wherein the film further contains an aromatic carboxylic ester represented by the formula [I]:

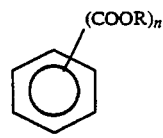

in which n is 3, 4, 5 or 6; R is an alkyl group or an alkenyl group, each of which may have one or more substituent groups; the benzene ring may have one or more substituent groups other than the groups represented by —COOR; and the groups represented by —COOR may be different from each other.

The cellulose ester film can be prepared by a process which comprises the steps of dissolving a cellulose ester, a phosphoric ester plasticizer and an aromatic carboxylic ester represented by the formula [I] in a solvent to prepare a dope, casting the dope on a support and evaporating the solvent.

The aromatic carboxylic ester represented by the formula [I] has an excellent affinity for both of a phosphoric ester plasticizer and a cellulose ester. Accordingly, the compound has a function of dissolving the phosphoric ester plasticizer in the cellulose ester. Therefore, the present invention can solve the problems of the phosphoric ester plasticizer, which are caused by the poor affinity of the plasticizer for the cellulose ester.

As is mentioned above, the cellulose ester film of the present invention does not cause bleeding even if a relatively large amount of the phosphoric ester plasticizer is used. Further, the cellulose ester film is greatly improved in dimensional stability and strength property.

Moreover, the film of the present invention is improved in the light piping property (the "light piping" is one of the causes of fogging). Furthermore, since the amount of the plasticizer in the film can be increased according to the present invention, the efficiency of drying the solvent in the process for preparation of the film can be improved. Therefore, the present invention is also advantageous with respect to the process for preparation of the cellulose ester film.

DETAILED DESCRIPTION OF THE INVENTION

The cellulose ester film of the present invention is characterized in the aromatic carboxylic ester represented by the formula [I].

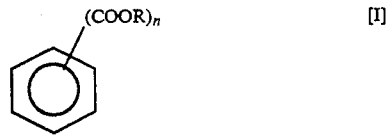

In the formula [I], n is 3, 4, 5 or 6, preferably 3 or 4, and more preferably 3.

R is an alkyl group or an alkenyl group. The alkyl group or the alkenyl group in the formula [I] preferably has 1 to 4 carbon atoms. Examples of the alkyl group include methyl, ethyl, propyl and butyl. Examples of the alkenyl group include propenyl and allyl. The alkyl group and the alkenyl group may have one or more substituent groups. Examples of the substituent group include a halogen atom, an alkoxy group (e.g., methoxy) and hydroxyl.

The benzene ring may have one or more substituent groups other than the groups represented by —COOR. Examples of the other substituent group include an alkyl group (e.g., methyl, ethyl), a hydroxylalkyl group (e.g., hydroxylmethyl), an alkoxy group (e.g., methoxy) and a halogen atom.

The groups represented by —COOR may be different from each other.

Where n is 3, the groups represented by —COOR are preferably attached to the 1, 2 and 4-positions of the benzene ring (namely, the compound represented by the formula [I] is a trimellitic ester). When n is 4, the groups represented by —COOR are preferably attached to the 1, 2, 4 and 5-positions of the benzene ring (namely, the compound represented by the formula [I] is a pyromellitic ester). A methyl or ethyl ester of a trimellitic acid or a pyromellitic acid is more preferred. Methyl or ethyl trimellitate is most preferred.

Examples of the aromatic carboxylic ester represented by the formula [I] are shown below.

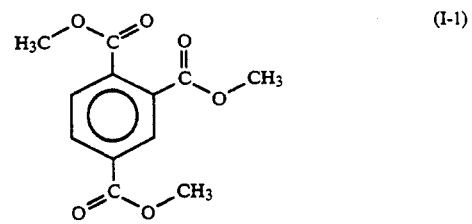

(I-1)

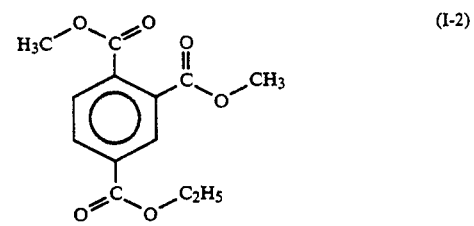

(I-2)

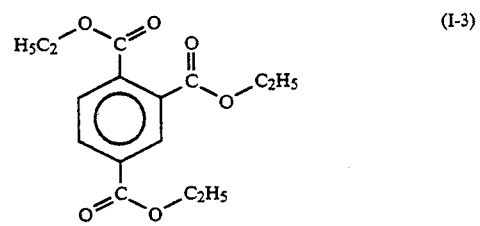

(I-3)

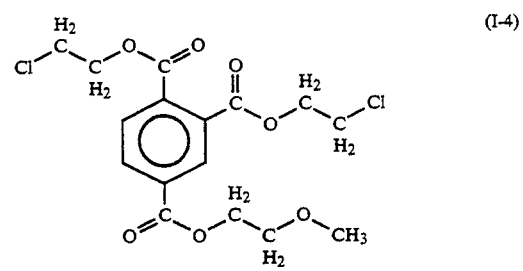

(I-4)

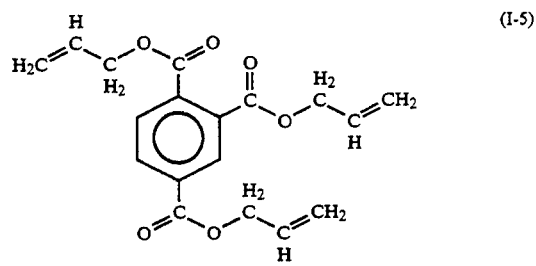

(I-5)

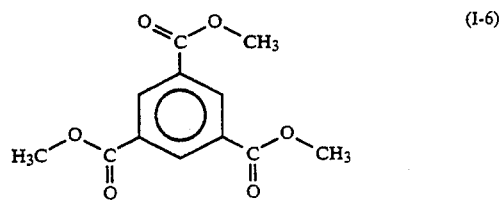

(I-6)

-continued

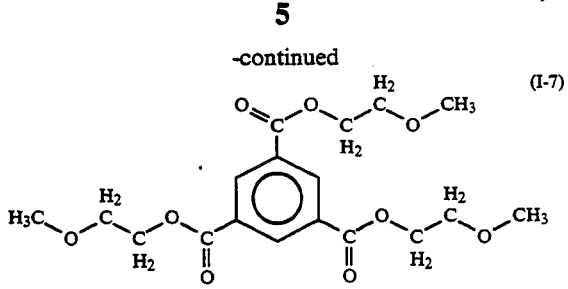 (I-7)

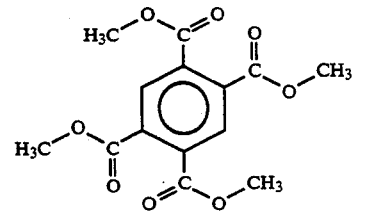 (I-8)

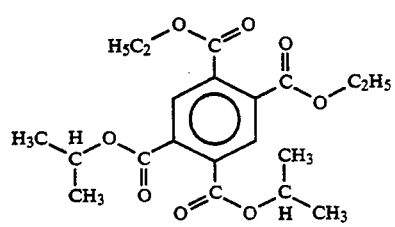 (I-9)

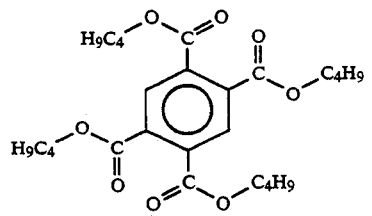 (I-10)

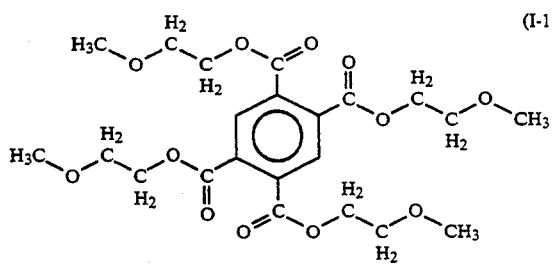 (I-11)

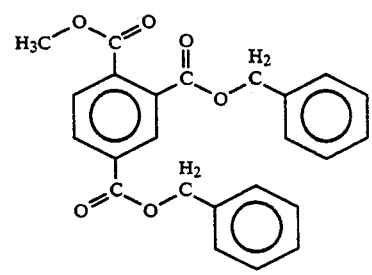 (I-12)

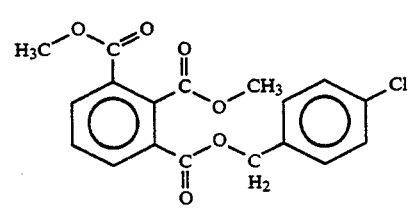 (I-13)

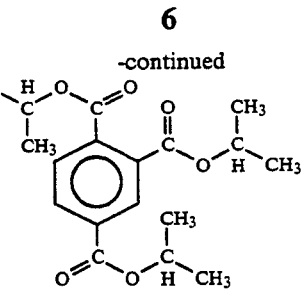 (I-14)

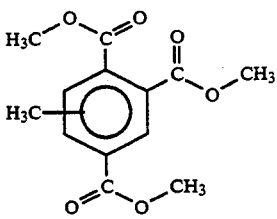 (I-15)

The aromatic carboxylic ester represented by the formula [I] can be synthesized by various methods. For example, the ester can be easily synthesized by esterifying a carboxylic anhydride or a carboxylic acid with a catalyst in the presence of an alcohol. Examples of the carboxylic anhydride or acid include trimellitic acid (anhydride), trimesic acid (anhydride) and pyromellitic acid (anhydride). Examples of the catalyst include sulfuric acid, hydrochloric acid, paratolunenesulfonic acid and tetrabutoxy tin.

Otherwise, the ester can be also synthesized by an ester-exchanging reaction of an ester with an alcohol in the presence of the above-mentioned catalyst.

Generally, it is preferred that the above-mentioned reactions are carried out at a high temperature. Furthermore, in synthesis of the ester, an acid chloride is synthesized by a reaction of a polyfunctional carboxylic acid (the starting material) with phosphorus oxychloride or thionyl chloride, and the acid chloride is then esterified with an alcohol in the presence of a basic catalyst (e.g., pyridine, triethylamine) to synthesize the ester. These methods are disclosed in Japanese Patent Publications No. 36(1961)-22593, No. 37(1962)-7227 and U.S. Pat. No. 3,058,942.

The cellulose ester film preferably contains the aromatic carboxylic ester in an amount of 3 to 50 weight % (more preferably 5 to 30 weight %) based on the amount of the phosphoric ester plasticizer.

Examples of cellulose ester used in the film of the present invention include cellulose acetate, cellulose acetate butylate and cellulose acetate propionate. Cellulose acetate is preferred in the case that the film is used as a support of a photographic material. Cellulose acetate (cellulose triacetate) having a degree of polymerization in the range of 250 to 400 and a degree of acetylization in the range of 54 to 62% is particularly preferred.

Next, the phosphoric ester plasticizer is described below.

Various phosphoric ester plasticizers have already been known and used in practice. A representative phosphoric ester plasticizer is a compound having the formula [IIa] or [IIb].

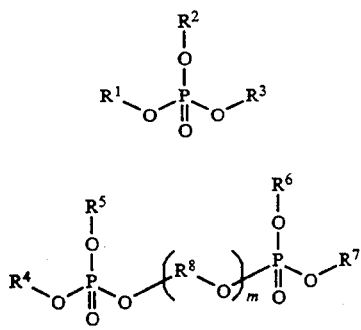

[IIa]

[IIb]

In the formulas [IIa] and [IIb], each of $R^1$, $R^2$, $R^3$, $R^4$, $R^5$, $R^6$ and $R^7$ independently is an alkyl group (including a cycloalkyl group), an aryl group or an aralkyl group. Each of the groups may have one or more substituent groups. The alkyl group preferably has 1 to 12 carbon atoms. Examples of the alkyl group include methyl, ethyl, butyl, cyclohexyl and octyl. An example of the aryl group is phenyl. An example of the aralkyl group is benzyl. Examples of the substituent group include an alkyl group (e.g., methyl), an aryl group (e.g., phenyl), an alkoxy group (e.g., methoxy, ethoxy) and an aryloxy group (e.g., phenoxy).

In the formula [IIb], $R^8$ is an alkylene group, an arylene group, sulfonyl or a combination thereof, and m is an integer of 1 or more (preferably 1 to 10).

Examples of the phosphoric ester plasticizer represented by the formula [IIa] or [IIb] are shown below.

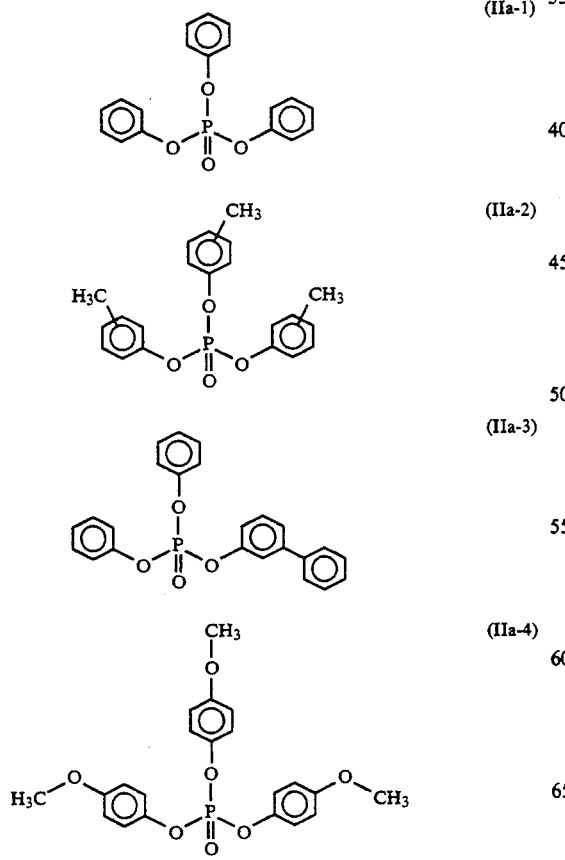

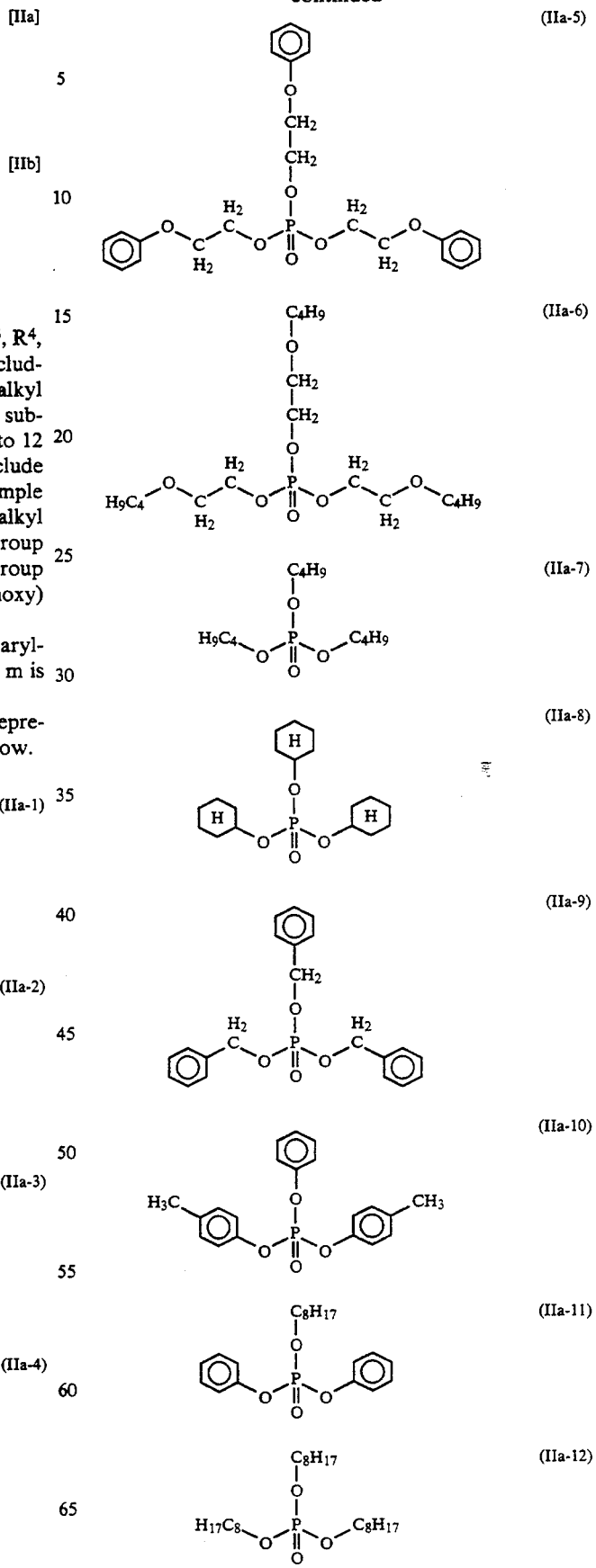

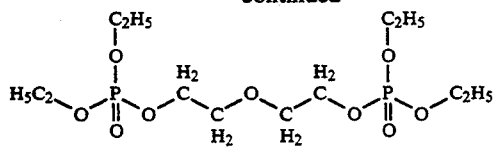 (IIb-1)

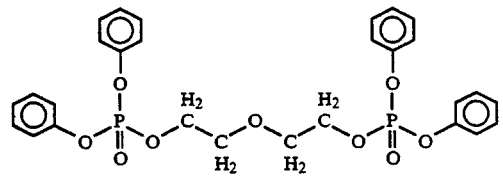 (IIb-2)

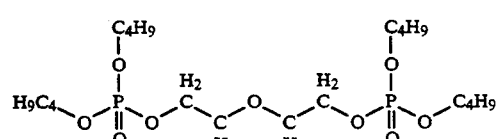 (IIb-3)

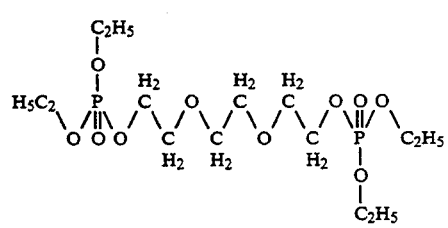 (IIb-4)

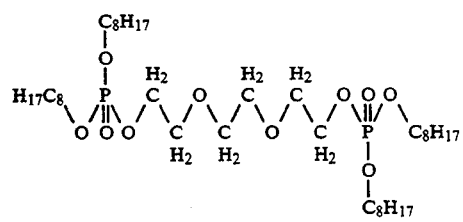 (IIb-5)

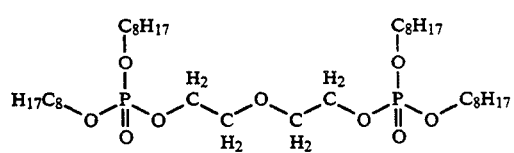 (IIb-6)

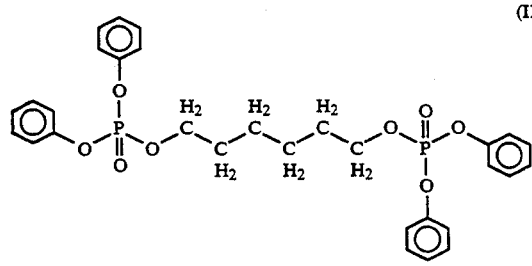 (IIb-7)

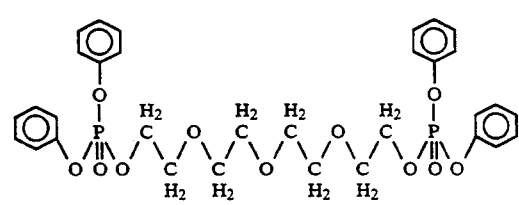 (IIb-8)

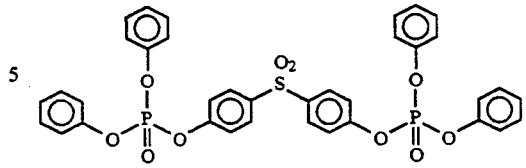 (IIb-9)

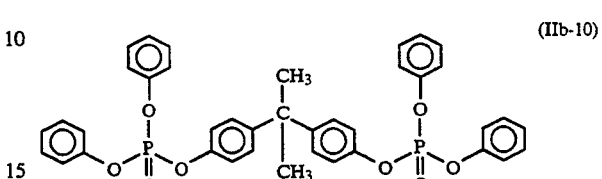 (IIb-10)

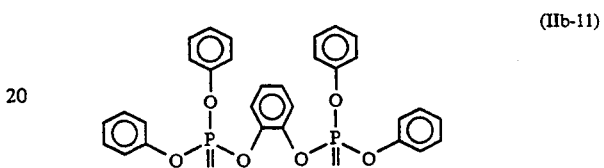 (IIb-11)

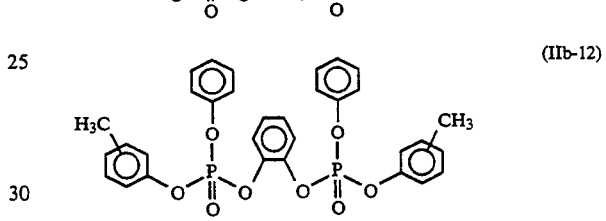 (IIb-12)

Triphenyl phosphate (IIa-1) is particularly preferred. Another monomeric plasticizer or a polymeric plasticizer can be used in combination with the phosphoric ester plasticizer.

The total amount of the plasticizers is usually in the range of 5 to 20 weight % based on the amount of the cellulose ester. In the present invention, a relatively large amount of the plasticizer (10 to 40 weight % based on the amount of the cellulose ester) can be used.

The thickness of the cellulose ester film is preferably in the range of 10 μm to 500 μm, and more preferably in the range of 50 μm to 200 μm.

The cellulose ester film of the present invention is preferably prepared by a process which comprises the steps of dissolving a cellulose ester, a phosphoric ester plasticizer and an aromatic carboxylic ester represented by the formula [I] in a solvent to prepare a dope, casting the dope on a support and evaporating the solvent. This method has been well known except that the aromatic carboxylic ester represented by the formula [I]. The process for preparation of the cellulose ester film is disclosed in U.S. Pat. Nos. 2,492,978, 2,739,070, 2,739,069, 2,492,977, 2,336,310, 2,367,603, 2,492,978 and 2,607,704; U.K. Patents No. 640,731 and No. 735,892, Japanese Patent Publications No. 45(1970)-9047, No. 49(1974)-4554 and No. 49(1974)-5614, and Japanese Patent Provisional Publication No. 62(1987)-115035.

Examples of the solvent include a lower aliphatic hydrocarbon chloride, a lower aliphatic alcohol, cyclohexane and dioxane. An example of the lower aliphatic hydrocarbon chloride is methylene chloride. Examples of the lower aliphatic alcohol include methanol, ethanol, n-propyl alcohol, iso-propyl alcohol and n-buthanol. Methylene chloride is a good solvent of the cellulose ester. The solvent preferably consists of methylene chloride in an amount of 70 to 100 weight % and another solvent (a poor solvent of the cellulose ester) in an amount of 30 to 0 weight %. It is more preferred that the solvent consists of methylene chloride in an amount of 75 to 87 weight % and another solvent in an amount of 25 to 13 weight %.

The concentration of the cellulose ester is preferably in the range of 10 to 50 weight %. The solid content of the dope is preferably in the range of 18 to 35 weight %.

The composition of the dope is preferably so adjusted that the dope is gelled at a temperature of not lower than 10° C. The gel point of the dope mainly depends on the concentration of the cellulose ester and the composition of the solvent. If the concentration of the cellulose ester or the poor solvent is high, the gel point is also high. If the concentration of the cellulose ester is not lower than 35 weight %, it is difficult to prepare a homogeneous dope. Further, if the ratio of the poor solvent in the total amount of the solvent is not lower than 25 weight %, a milky turbidity is caused and the velocity of the dope is so increased that it is difficult to handle the dope.

A dyes or a release agent (which makes it easy to peel off the film from the support) can be optionally added to the dope.

The dope can be prepared by placing and sealing the cellulose ester, the solvent, the phosphoric ester plasticizer and the aromatic carboxylic ester represented by the formula [I] in a pressure vessel, and stirring them while heating under pressure. The heating temperature is not lower than the boiling point of the solvent at atmospheric pressure, and is not higher than the boiling point under the pressure in the vessel. The heating temperature usually is not lower than 60° C., and preferably is in the range of 80° to 110° C. Where the dope is prepared under pressure as is mentioned above, the dope can be heated at a temperature of not lower than the boiling point of the solvent. Further, the pressure prevents the boiling of the solvent to prevent the dope from an excess concentration. The excess concentration may cause a gel in the dope. On the other hand, the solubility of the components can be increased by heating to quickly dissolve them in the solvent.

The components can be crudely mixed, and then placed in the pressure vessel. The components can also be placed in the vessel in the order. A heating device and a stirring device is preferably attached to the pressure vessel.

An inert gas such as nitrogen gas can be injected into the vessel to pressure the components. Further, the increase of the vapor pressure of the solvent while heating can be available as the pressure. Furthermore, the components can be injected into the vessel under pressure after the vessel is sealed.

The vessel is preferably heated from outside. For example, a jacket type heating device can be used. Further, a plate heater can be attached to the pressure vessel via a liquid circulated in a pipe which is arranged around the vessel.

A stirring wing is preferably attached to the pressure vessel. The stirring wing preferably reaches the inside wall of the vessel. A scratching wing is preferably attached at the end of the stirring wing to replace the liquid membrane formed along the wall of the vessel.

Meters such as a thermometer and a manometer can be attached to the pressure vessel.

The components are dissolved in the solvent in the vessel. The prepared dope is taken out after the vessel is cooled, or the dope is cooled after the dope is taken out the vessel. The vessel or the dope can be cooled by a heat exchanger.

The prepared dope is cast on a support. An example of the support is a band or a drum.

After the dope is cast on a support, the support from the casting part to the peeling part, particularly the peeling part of the support is preferably cooled. It is more preferred to cool the surface of the support, since the film is peeled from the support along the interface thereof. The support can be directly cooled by refrigerant or cool air. Further, the support can also be cooled by refrigerant circulated in a pipe. The cooling temperature at the surface of the support preferably is not higher than 10° C., and more preferably is not higher than 5° C.

The solvent is evaporated from the cast dope. The solvent can be evaporated without heating. However, use of a drying wind has an advantage of drying the surface of the film before peeling it to prevent the film from stretching after peeling off.

In the case that the drying wind is used, it should be cautioned not to increase the temperature on the surface of the support. If the surface temperature within the area where the dope is not cast is increased by the drying wind, the solvent is evaporated in the dope to cause foam. Accordingly, a device for shielding heat is preferably used. Further, the support on which the dope is cast is preferably cooled as is mentioned above.

An example of the device for shielding heat is a screening board. The board is arranged on the support between the area on which the dope is cast and the area on which the dope is not cast to prevent the drying wind from contacting the area on which the dope is not cast. A curtain or an air curtain can also be provided to shield the drying wind. The shielding device is preferably arranged along the whole flow of the drying wind on the surface of the support such as a band. However, the device along the latter half of the support may be omitted, since the foam is scarcely formed when the film is dried. Further, the device can be omitted around an exhausting area where most of the heat of the drying wind is consumed.

The cellulose ester film of the present invention can be prepared according to the process mentioned above. In the process, the most preferred conditions are the following three points.

(1) The solid content in the dope is in the range of 18 to 35 weight %.

(2) 75 to 87 weight % of the solvent is methylene chloride.

(3) The surface temperature of the support at the step of casting the dope on the support is not higher than 10° C.

The cellulose film of the present invention is preferably used as a support of a photographic material. The photographic material is described below.

The photographic material comprises a silver halide emulsion layer provided on a support. An undercoating layer is usually provided between the support and the silver halide emulsion layer. The undercoating layer mainly comprises gelatin.

A hardening agent for gelatin may be added to the undercoating layer. Example of the hardening agent include a chromium salt (e.g., chrome alum), an aldehyde (e.g., formaldehyde, glutaric aldehyde), an isocyanate, an active halogen compound (e.g., 2,4-dichloro-6-hydroxytriazine) and an epichlorohydrine resin.

A matting agent may also be added to the undercoating layer. Examples of the matting agent include inorganic particles (e.g., $SiO_2$, $TiO_2$) and particles of polymethylmethacrylate copolymer (particle size: 1 to 10 μm).

The undercoating layer can be coated on the support by a dip coating method, an air knife coating method, a curtain coating method, a wire bar coating method, a gravure coating method or an extrusion coating method.

Next, the silver halide emulsion layer and the other layers of the photographic material are described below.

The layers of the photographic material contain a hydrophilic colloid as a binder. Examples of the hydrophilic colloid include a protein (e.g., gelatin; colloidal albumin, casein), a cellulose derivative (e.g., carboxymethyl cellulose, hydroxyethyl cellulose), a saccharide derivative (e.g., agar, sodium alginate, a starch derivative) and a synthetic hydrophilic colloid (e.g., polyvinyl alcohol, poly-N-vinylpyrrolidone, a polyacrylic acid co-polymer and polyacrylamide, derivatives thereof and partial hydrolysates thereof). Two or more colloids can be used in combination. Gelatin is generally used as the colloid.

The silver halide emulsion layer and other layers may contain a synthetic polymer. The synthetic polymer may be used in combination with the above-mentioned hydrophilic colloid. In the case that the synthetic polymer is vinyl polymer, the polymer can be used as a latex in water. A copolymer as well as a homopolymer is available. The synthetic polymer include a compound which has a function of improving the dimensional stability of the photographic material. Examples of the monomer contained in the synthetic polymer include an alkyl acrylate, an alkyl methacrylate, acrylic acid, methacrylic acid, a sulfoalkyl acrylate, a sulfoalkyl methacrylate, glycidyl acrylate, glycidyl methacrylate, a hydroxylalkyl acrylate, a hydroxylalkyl methacrylate, an alkoxyalkyl acrylate, an alkoxyalkyl methacrylate, styrene, butadiene, vinyl chloride, vinylidene chloride, maleic anhydride and itaconic anhydride. The synthetic polymers used in the photographic film are disclosed in U.S. Pat. Nos. 2,376,005, 2,739,137, 2,853,457, 3,062,674, 3,411,911, 3,488,708, 3,525,620, 3,635,715, 3,607,290 and 3,645,740, and U.K. Patents No. 1,186,699 and No. 1,307,373.

The photographic emulsion layer and other layers is preferably hardened by using a hardening agent. Examples of the hardening agent include an aldehyde (e.g., formaldehyde, glutaraldehyde), a ketone (e.g., diacetyl, cyclopentadione), an active halogen compound (e.g., bis(2-chloroethyl urea), 2-hydroxy-4,6-dichloro-1,3,5-triazine), an active olefin compound (e.g., divinylsulfone, 5-acetyl-1,3-diacryloylhexahydro-1,3,5-triazine), an N-methylol compound (e.g., N-hydroxymethylphthalimido), an isocyanate, an aziridine compound, an acid derivative, a carbodiimide, an epoxy compound, an iso-oxazole compound, a halogenocarboxyaldehyde (e.g., mucochloric acid), a dioxane derivative (e.g., dihydroxydioxane, dichlorodioxane), an N-carbamoylpyridinium salt, a haloamidinium salt and an inorganic hardening agent (e.g., chromium alum and zirconium sulfate). The active halogen compound is disclosed in U.S. Pat. Nos. 3,288,775 and 2,732,303, and U.K. Patents No. 974,723 and No. 1,167,207. The active olefin compound is disclosed in U.S. Pat. Nos. 3,635,718, 3,232,763, 3,490,911 and 3,642,486, and U.K. Patent No. 994,869. The N-methylol compound is disclosed in U.S. Pat. Nos. 2,732,316 and 2,586,168. The isocyanate is disclosed in U.S. Pat. No. 3,103,437. The aziridine compound is disclosed in U.S. Pat. Nos. 3,017,280 and 2,983,611. The acid derivative is disclosed in U.S. Pat. Nos. 2,725,294 and 2,725,295. The carbodiimide compound is disclosed in U.S. Pat. No. 3,100,704. The epoxy compound is disclosed in U.S. Pat. No. 3,091,537. The iso-oxazole compound is disclosed in U.S. Pat. Nos. 3,321,313 and 3,543,292. A precursor of the hardening agent is also available. Examples of the precursor include an addition compound of an alkali metal bisulfite, a methylol derivative of hydantoin and a nitro alcohol of a primary fatty acid.

The silver halide emulsion is usually prepared by mixing a solution of water-soluble silver salt (e.g., silver nitrate) and a solution of water-soluble halide salt (e.g., potassium bromide) in the presence of a solution of water-soluble polymer (e.g., gelatin). A mixed silver halide such as silver bromochloride, silver bromoiodide and silver bromochloroiodide is available as well as silver chloride and silver bromide.

Various compounds may be added to the silver halide emulsion to prevent the fogging and the deterioration of the sensitivity. Various compounds having the above-mentioned functions have been well known. Examples of the compounds include a heterocyclic compound (e.g., 4-hydroxy-6-methyl-1,3,3a,7-tetrazaindene, 3-methyl-benzthiazole, 1-phenyl-5-mercaptotetrazole), a mercury compound, a mercapto compound and a metal salt.

The silver halide emulsion can be chemically sensitized. Examples of the chemical sensitizer include a gold compound (e.g., chloroaurates, auric chloride), a salt of another noble metal (e.g., platinum, palladium, iridium, rhodium, ruthenium), a sulfur compound which reacts with a silver salt to form silver sulfide, stannous chloride, an amine and other reducing compounds.

The silver halide emulsion may be subject to spectral sensitization or color sensitization. In this case a cyanine dye (e.g., cyanine, merocyanine and carbocyanine) or a styryl dye is used. These dyes can be used singly or in combination.

The non-light-sensitive layers of the photographic material may contain a whitening agent, a U.V. absorber and a light absorber. Examples of the whitening agent include stilbene, triazine, oxazole and coumarin compounds. Examples of the U.V. absorber include benztriazole, thiazoline and cinnamate compounds. Examples of the light absorber are various known photographic filter dyes.

Further, a lubricant or a coating aid (e.g., an amide or of a fatty acid, a polyester), a water-insoluble substance and a surface active agent can be added to the photographic material. The lubricant and the coating aid is disclosed in U.S. Pat. Nos. 2,732,305, 4,042,399 and 3,121,060, and U.K. Patent No. 14,466,304. The water-insoluble substance is disclosed in U.S. Pat. No. 3,121,060, and U.K. Patents No. 1,320,564 and No. 1,320,565. The surface active agent is disclosed in U.S. Pat. No. 3,617,286.

An antistatic agent may be contained in the layers of the photographic material such as a silver halide emulsion emulsion layer. The antistatic agent is preferably added to an uppermost layer (an antistatic layer) of the photographic material. Examples of the antistatic agent include a hydrophilic polymer, a hydrophobic polymer, a biguanide compound, a sulfonic acid anionic compound, a phosphate ester and a quaternary ammonium salt, a cationic compound, a nonionic compound, an amphoteric compound, a complex compound and an organic salt. The hydrophilic polymer is disclosed in U.S. Pat. Nos. 2,725,297, 2,972,535, 2,972,536, 2,972,537, 2,972,538, 3,033,679, 3,072,484, 3,262,807, 3,525,621, 3,615,531, 3,630,743, 3,653,906, 3,655,384, 3,655,386 and U.K. Patents No. 1,222,154 and No. 1,235,075. The hydrophobic polymer is disclosed in U.S. Pat. Nos. 2,973,263 and 2,976,148. The biguanide compound is disclosed in U.S. Pat. Nos. 2,584,362 and 2,591,590. The sulfonic acid anionic compound is disclosed in U.S. Pat. Nos. 2,639,234, 2,649,372, 3,201,251 and 3,457,076. The phosphate and the quaternary ammonium salt are disclosed in U.S. Pat. Nos. 3,317,344 and 3,514,291. The cationic compound is disclosed in U.S. Pat. Nos. 2,882,157, 2,982,651, 3,399,995, 3,549,369 and 3,564,043. The nonionic compound is disclosed in U.S. Pat. No. 3,625,695. The amphoteric compound is disclosed in U.S. Pat. No. 3,736,268. The complex compound is disclosed in U.S. Pat. No. 2,647,836. The organic salt is disclosed in U.S. Pat. Nos. 2,717,834 and 3,655,387.

The silver halide emulsion include an orthochromatic emulsion, a panchromatic emulsion, an emulsion for invisible light (e.g., I.R., X-ray) and a color silver halide emulsion such as an emulsion containing a color forming coupler, a color developing agent or a bleachable dye.

The silver halide emulsion for a color photographic material may contain a divalent or quadrivalent color forming coupler. Examples of color forming coupler include a chain-opening type ketomethylene yellow coupler (e.g., a benzoylacetanilide compound, a pivaloylacetanilide compound), a magenta coupler (e.g., a pyrazolone compound, an indazolone compound), a cyan coupler (e.g., a phenol compound and a naphthol compound), a colored coupler and a elimination-inhibited type coupler. The yellow coupler is disclosed in Japanese Patent Publication No. 48(1973)-18256. The magenta coupler is disclosed in Japanese Patent Publication No. 48(1973)-38416. The cyan coupler is disclosed in Japanese Patent Provisional Publication No. 48(1973)-42732. The colored coupler is disclosed in U.S. Pat. Nos. 2,428,054, 2,449,966, 2,455,170, 2,600,788, 2,983,608 and 3,148,062. The elimination-inhibited type coupler is disclosed in U.S. Pat. No. 3,227,554.

The example of the present invention is described below.

EXAMPLE 1

A dope of the following composition was prepared.

| | |
|---|---|
| Cellulose triacetate (degree of acetylization: 60.8%, degree of polymerization: 262) | 100 weight parts |
| Methylene chloride | 309 weight parts |
| N-butanol | 57 weight parts |
| Methanol | 11 weight parts |
| Phosphoric ester plasticizer and the other additives set forth in Table 1 | |

The dope was cast on a casting machine having a band (effective length: 6 m) to form a film having dry thickness of 135 μm. A shielding board was used to prevent the temperature of the portion of the support where the dope was not cast from increasing by a drying wind.

The limitation of the casting rate (limiting rate) for continuously forming a transparent flat film was 10 m/minutes. The cast dope was placed on the band at the limiting rate for 20 seconds (limiting peering time).

A photographic material was prepared in the following manner using the above-prepared cellulose ester film as the support.

The following coating solution was coated on the film in amount of 35 ml/m$^2$, and dried at 90° C. for 3 minutes to form a backing layer.

| | |
|---|---|
| Carbon black (mean size of primary grain: 20 μm) | 9.6 weight parts |
| Hydroxypropylmethylcellulose hexahydrophthalate (hexahydrophthalate: 38 mol %, hydroxypropyl group: 8 mol %, methoxy group: 16 mol %) | 20 weight parts |
| Acetone | 600 weight parts |
| Methyl cellosolve | 150 weight parts |
| Methanol | 200 weight parts |

An undercoating layer was provided on the reverse side of the film (i.e., the surface on which the backing layer was not provided). The following layers were formed on the undercoating layer to prepare a multi-layered color photographic material (Samples No. 1 to 9).

| | |
|---|---|
| The first layer: Blue sensitive emulsion layer | |
| Silver bromoiodide emulsion [silver iodide: 0.2 mol %] | 1.0 g/m$^2$ (the amount of coated silver) |
| Sensitizing dye (1) | $3 \times 10^{-4}$ mol (per 1 mol of silver) |
| Coupler (1) | $2 \times 10^{-1}$ mol (per 1 mol of silver) |
| Coupler (2) | $2 \times 10^{-1}$ mol (per 1 mol of silver) |
| The second layer: Intermediate layer | 0.5 g/m$^2$ (gelatin content) |
| The gelatin layer containing an emulsion of 2,5-di-t-octyl-hydroquinone | |
| The third layer: Red sensitive emulsion layer | |
| Silver bromochloride emulsion [silver bromide: 30 mol %] | 0.5 g/m$^2$ (the amount of coated silver) |
| Sensitizing dye (2) | $6 \times 10^{-5}$ mol (per 1 mol of silver) |
| Coupler (3) | $1 \times 10^{-1}$ mol (per 1 mol of silver) |
| Coupler (4) | $4 \times 10^{-1}$ mol (per 1 mol of silver) |
| The fourth layer: Intermediate layer | |
| The same as the second layer | |
| The fifth layer: Green sensitive emulsion layer | |
| Silver bromochloride emulsion | 0.5 g/m$^2$ (the amount of coated silver) |
| Sensitizing dye (3) | $0.5 \times 10^{-3}$ mol (per 1 mol of silver) |
| Coupler (3) | $2 \times 10^{-1}$ mol (per 1 mol of silver) |
| The sixth layer: Green sensitive emulsion layer | |
| Silver bromochloride emulsion | 0.2 g/m$^2$ (the amount of coated silver) |
| Sensitizing dye (3) | $1.0 \times 10^{-3}$ mol (per 1 mol of silver) |
| Coupler (5) | $2 \times 10^{-1}$ mol (per 1 mol of silver) |
| The seventh layer: Protective layer | 0.7 g/m$^2$ |

-continued
| Gelatin |
|---|
The sensitizing dyes and couplers are shown below.
Sensitizing dye (1)
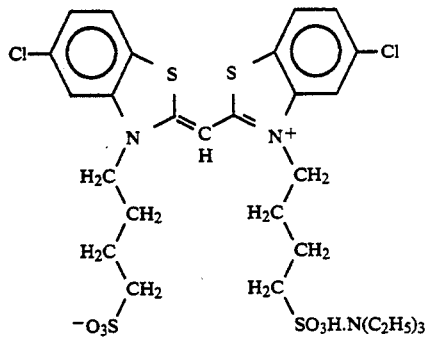
Sensitizing dye (2)
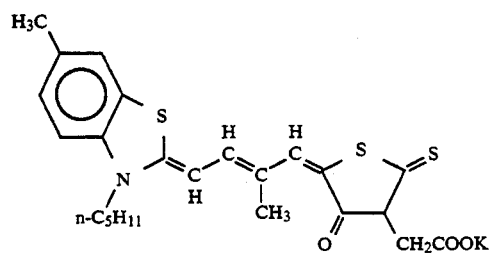
Sensitizing dye (3)
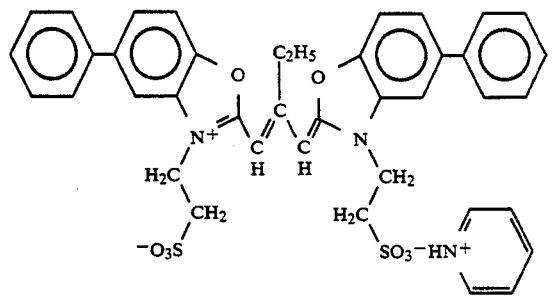
Sensitizing dye (4)
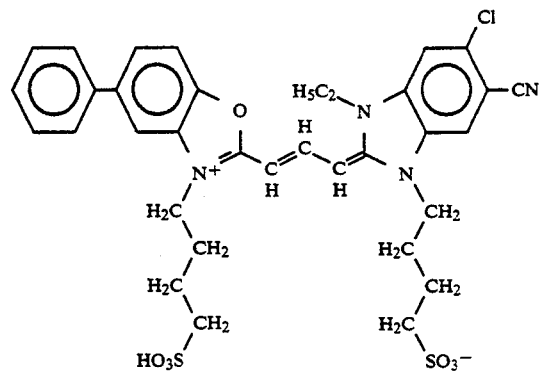
Sensitizing dye (5)
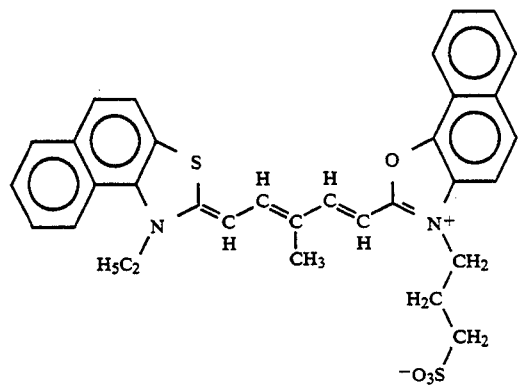
Coupler (1)
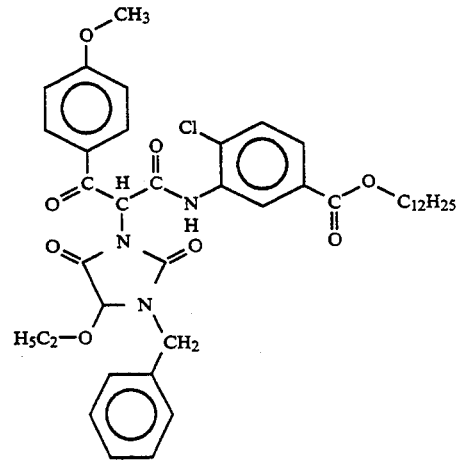
Coupler (2)
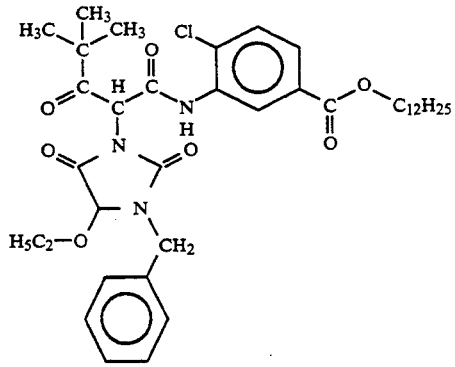
Coupler (3)
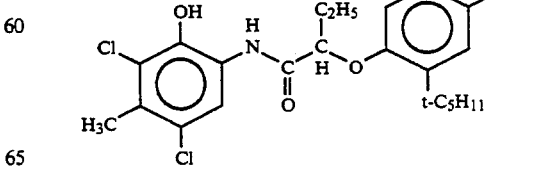
Coupler (4)

-continued

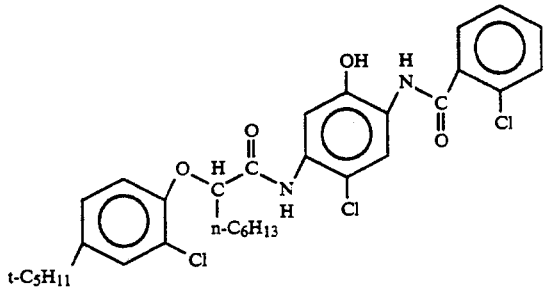

Coupler (5)

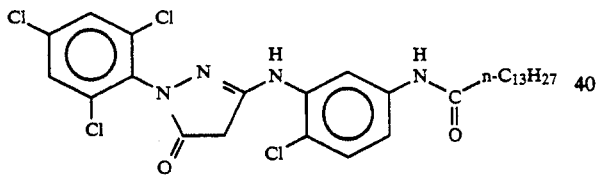

Each of the obtained samples (No. 1 to No. 9) was left for 1 week, and then cut and perforated to prepare a rolled film having length of and width of 35 mm.

The tested subjects were (1) folding endurance, (2) impact strength and (3) bleeding.

The evaluation methods and the results (shown in Table 1) are described below. (1) The measurement of folding endurance In accordance with the regulation of ISO8776-1988, the number of folding times to break the film was measured by means of MIT folding tester (available from TOYO SEIKI SEISAKUSHO Co., Ltd.).

(2) The measurement of impact strength

One end of 83 cm of the film was fixed and a plummet of 5 kg was equipped at the other end, and then the film was suspended. The plummet was vertically lifted up to various heights (h) from the initial position (h=0), and then freely dropped. In accordance with ASTM D1709-85, the height of 50% break ($h_{50}$) was measured. The measurement described in ASTM D1709-85 was carried out except that the height (h) was measured instead of weight (W). The impact strength was estimated from the potential energy ($5gh_{50}$) (J) of the height ($h_{50}$). In the case where the break occurred at the fixed point or the point at which the plummet was equipped, the same test was again carried out.

(3) Bleeding test

A weighing bottle of 25 cc containing 5 cc of ether was covered with the film, and then a plate of glass was put thereon to shield the bottle. After 2, 4 and 8 minutes, the film was removed from the bottle. The obtained film was left under the condition of 60% RH at the temperature of 25° C. for 30 minutes, and then the degree of bleeding of the plasticizer was evaluated with naked eyes.

—: Not observed

±: Scarcely observed

+: Remarkably observed

‡: Remarkably observed to a large extent

TABLE 1

| Plasticizer and other additives | Sample No. | | | | | | | | | |
|---|---|---|---|---|---|---|---|---|---|---|
| | 1 | 2 | 3 | 4 | 5 | 6 | 7 | 8 | 9 | 10 |
| Triphenyl phosphate | 10 | 18 | 18 | 18 | 18 | 18 | 18 | 18 | 18 | 18 |
| Biphenyldiphenyl phosphate | 0 | 3 | 0 | 0 | 0 | 0 | 0 | 0 | 0 | 0 |
| Nonylphenyldiphenyl phosphate | 0 | 0 | 3 | 0 | 0 | 0 | 0 | 0 | 0 | 0 |
| Diethylene glycol bis (dibutyl phosphate) | 0 | 0 | 0 | 3 | 0 | 0 | 0 | 0 | 0 | 0 |
| Diethyl phthalate | 0 | 0 | 0 | 0 | 3 | 0 | 0 | 0 | 0 | 0 |
| Dimethoxyethyl phthalate | 0 | 0 | 0 | 0 | 0 | 3 | 0 | 0 | 0 | 0 |
| (I-3) | 0 | 0 | 0 | 0 | 0 | 0 | 3 | 0 | 0 | 0 |
| (I-7) | 0 | 0 | 0 | 0 | 0 | 0 | 0 | 3 | 0 | 0 |
| (I-1) | 0 | 0 | 0 | 0 | 0 | 0 | 0 | 0 | 3 | 3 |
| Folding endurance (folding times) | 65 | 120 | 130 | 170 | 140 | 160 | 130 | 130 | 130 | 170 |
| Impact strength (J) | 10 | 14 | 14 | 15 | 14 | 14 | 14 | 14 | 14 | 16 |
| Bleeding | + | ‡ | ‡ | + | ‡ | + | ± | ± | — | ± |

The film practically used should satisfy the conditions that (1) the folding endurance is not less than 80 times, (2) the impact strength is not less than 13 J and (3) the bleeding is evaluated as (—) or (±).

It is apparent from the comparison of the result of No. 1 with that of No. 9 set forth in Table 1 that both of the folding endurance and the impact strength are remarkably improved by increasing the amount of triphenylphosphate. Furthermore, it is apparent from the comparison of as is evident from the comparison of the results of No. 2 to No. 6 with those of No. 7 to No. 9 that the aromatic carboxylic ester represented by the formula [I] specifically inhibits the bleeding of the plasticizer.

We claim:

1. A cellulose ester film which contains a phosphoric ester plasticizer, wherein the film further contains an aromatic carboxylic ester represented by formula (I):

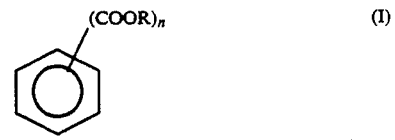

in which n is 3, 4, 5 or 6; R is an alkyl group or an alkenyl group, each of which may have one or more substituent groups; the benzene ring may have one or more substituent groups other than the groups represented by —COOR; and the groups represented by —COOR may be different from each other;

wherein the film contains the aromatic carboxylic ester in an amount of 3 to 50 weight % based on the amount of the phosphoric ester plasticizer.

2. The cellulose ester film as claimed in claim 1, wherein n in the formula (I) is 3 or 4.

3. The cellulose ester film as claimed in claim 1, wherein n in the formula (I) is 3.

4. The cellulose ester film as claimed in claim 1, wherein the alkyl group or the alkenyl group in the formula (I) has 1 to 4 carbon atoms.

5. The cellulose ester film as claimed in claim 1, wherein the phosphoric ester plasticizer is represented by the formula (IIa) or (IIb):

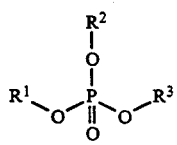
(IIa)

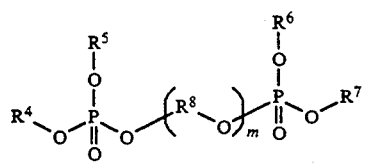
(IIb)

in which each of $R^1$, $R^2$, $R^3$, $R^4$, $R^5$, $R^6$ and $R^7$ independently is an alkyl group, an aryl group or an aralkyl group, each of which may have one or more substituent groups, $R^8$ is an alkylene group, an arylene group, sulfonyl or a combination thereof; and m is an integer of 1 or more.

6. The cellulose ester film as claimed in claim 1, wherein the phosphoric ester plasticizer is triphenyl phosphate.

7. The cellulose ester film as claimed in claim 1, wherein the amount of the phosphoric ester plasticizer is in the range of 10 to 40 weight % based on the amount of the cellulose ester.

8. The cellulose ester film as claimed in claim 1, wherein the cellulose ester film comprises cellulose acetate.

9. The cellulose ester film as claimed in claim 1, wherein the thickness of the film is in the range of 10 μm to 500 μm.

10. A process for preparation of a cellulose ester film, which comprises the steps of dissolving a cellulose ester and a phosphoric ester plasticizer in a solvent to prepare a dope, casting the dope on a support and evaporating the solvent, wherein the dope further contains an aromatic carboxylic ester represented by formula (I):

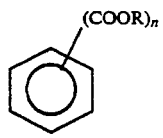
(I)

in which n is 3, 4, 5 or 6; R is an alkyl group or an alkenyl group, each of which may have one or more substituent groups; the benzene ring may have one or more substituent groups other than the groups represented by —COOR; and the groups represented by —COOR may be different from each other;

wherein the film contains the aromatic carboxylic ester in an amount of 3 to 50 weight % based on the amount of the phosphoric ester plasticizer.

11. The process as claimed in claim 10, wherein the solid content in the dope is in the range of 18 to 35 weight %.

12. The process as claimed in claim 10, wherein 75 to 87 weight % of the solvent is methylene chloride.

13. The process as claimed in claim 10, wherein the surface temperature of the support at the step of casting the dope on the support is not higher than 10° C.

* * * * *